US009534883B1

(12) United States Patent
Szwaykowski et al.

(10) Patent No.: US 9,534,883 B1
(45) Date of Patent: Jan. 3, 2017

(54) METHODS FOR DETERMINING ERROR IN AN INTERFEROMETRY SYSTEM (71) Applicant: ENGINEERING SYNTHESIS DESIGN, INC., Tucson, AZ (US)

(72) Inventors: Piotr Szwaykowski, Glendale, CA (US); Raymond J. Castonguay, Tucson, AZ (US)

(*) Notice: Subject to any disclaimer, the term of this patent is extended or adjusted under 35 U.S.C. 154(b) by 491 days.

(21) Appl. No.: 13/684,439

(22) Filed: Nov. 23, 2012

Related U.S. Application Data (60) Provisional application No. 61/629,629, filed on Nov. 22, 2011.

(51) Int. Cl.
*G01B 9/02* (2006.01)
(52) U.S. Cl.
CPC ................. *G01B 9/02072* (2013.04)
(58) Field of Classification Search
CPC .................. G01B 9/02; G01B 11/02
USPC .......... 356/491, 495, 477, 511, 486
See application file for complete search history.

(56) References Cited

U.S. PATENT DOCUMENTS

| 3,950,103 | A | 4/1976 | Schmidt-Weinmar | |
|---|---|---|---|---|
| 3,958,884 | A | 5/1976 | Smith | 356/495 |
| 4,201,473 | A | 5/1980 | Domenicali et al. | 356/514 |
| 4,583,855 | A | 4/1986 | Bareket | 356/521 |
| 4,597,665 | A | 7/1986 | Galbraith et al. | 356/239.8 |
| 4,710,642 | A | 12/1987 | McNeil | 250/559.04 |
| 4,732,483 | A | 3/1988 | Biegen | 356/495 |
| 4,776,101 | A | 10/1988 | Ishibai | 33/351 |
| 4,872,755 | A | 10/1989 | Kuchel | 356/495 |
| 5,054,925 | A | 10/1991 | Hunter | 356/508 |
| 5,055,695 | A | 10/1991 | Lange | 250/459.1 |
| 5,064,286 | A | 11/1991 | Ai et al. | 356/153 |
| 5,241,369 | A | 8/1993 | McNeil et al. | 356/445 |

(Continued)

FOREIGN PATENT DOCUMENTS

| DE | 19652113 | 6/1998 | |
|---|---|---|---|
| WO | WO 2004/051182 | 6/2004 | G01B 9/02 |

OTHER PUBLICATIONS

Hettwer et al. "Three channel phase-shifting interferometers using polarization-optics and a diffraction granting", Optical Engineering, Sep. 21, 1999, pp. 960-966, vol. 39.

(Continued)

*Primary Examiner* — Tarifur Chowdhury
*Assistant Examiner* — Jamil Ahmed
(74) *Attorney, Agent, or Firm* — Hayes Soloway P.C.

(57) ABSTRACT

Polarization based interferometric methods suffer from errors caused by the internal instrument birefringence. Disclosed herein are methods for using dual interferometric measurements allow separating the influence of instrument errors (e.g., due to geometry and birefringence errors) and the measured part. The interferometric system error in an interferometry system having two light sources orthogonally polarized with respect to each other wherein each light source reflects from a reference surface and a test surface, creating four reflected beams (Wr, Vr, Wt, Vt), may be determined by performing a first interference measurement (M1) from Wr-Vt. A second interference measurement (M2) from Wt-Vr is performed and a third measurement (M3), indicative of the interferometric system error, is calculated by averaging the first and second measurements ([M1+M2]/2).

19 Claims, 4 Drawing Sheets (56) References Cited

U.S. PATENT DOCUMENTS

| | | | |
|---|---|---|---|
| 5,313,542 A | 5/1994 | Castonguay | |
| 5,471,305 A | 11/1995 | Yoneda et al. | 356/508 |
| 5,475,617 A | 12/1995 | Castonguay | |
| 5,491,552 A | 2/1996 | Knuttel | 356/495 |
| 5,563,706 A | 10/1996 | Shibuya et al. | 356/495 |
| 5,615,294 A | 3/1997 | Castonguay | |
| 5,625,451 A | 4/1997 | Schiff et al. | 356/236 |
| 5,640,246 A | 6/1997 | Castonguay | |
| 5,729,640 A | 3/1998 | Castonguay | |
| 5,737,079 A | 4/1998 | Burge et al. | 356/348 |
| 5,774,224 A | 6/1998 | Kerstens | 356/394 |
| 5,777,738 A | 7/1998 | Kulawiec | 359/512 |
| 5,835,217 A | 11/1998 | Medecki | 356/521 |
| 5,995,223 A | 11/1999 | Power | 356/495 |
| 6,034,776 A | 3/2000 | Germer et al. | 356/369 |
| 6,118,521 A | 9/2000 | Jung et al. | 356/73 |
| 6,122,047 A | 9/2000 | Stover et al. | 356/237.3 |
| 6,128,080 A | 10/2000 | Janik et al. | |
| 6,304,330 B1 | 10/2001 | Millerd et al. | 356/521 |
| 6,341,015 B2 | 1/2002 | Shirley | 356/517 |
| 6,456,382 B2 | 9/2002 | Ichihara et al. | 356/513 |
| 6,552,808 B2 | 4/2003 | Millerd et al. | 356/521 |
| 6,573,997 B1 | 6/2003 | Goldberg et al. | 356/521 |
| 6,578,963 B2 | 6/2003 | Pettit | 351/212 |
| 6,690,474 B1 | 2/2004 | Shirley | 356/603 |
| 6,809,845 B1 | 10/2004 | Kim et al. | 359/9 |
| 7,256,895 B2 | 8/2007 | Castonguay | 256/511 |
| 7,561,279 B2 | 7/2009 | Castonguay et al. | 356/495 |
| 7,609,388 B2 | 10/2009 | Arieli et al. | 356/512 |
| 7,649,634 B2 | 1/2010 | Wan | 356/504 |
| 8,004,687 B2 | 8/2011 | Szwaykowski et al. | 356/495 |
| 2002/0093648 A1 | 7/2002 | Nikoonahad et al. | 356/237.1 |
| 2003/0095264 A1 | 5/2003 | Ruchet | 356/491 |
| 2006/0146340 A1 | 7/2006 | Szwaykowski et al. | 356/495 |
| 2006/0146341 A1* | 7/2006 | Szwaykowski et al. | 356/495 |
| 2006/0221348 A1* | 10/2006 | Deck | 356/511 |
| 2006/0228010 A1 | 10/2006 | Rubbert et al. | 382/128 |
| 2007/0110334 A1 | 5/2007 | Takahashi et al. | 382/276 |
| 2007/0296979 A1 | 12/2007 | Morimoto et al. | 356/609 |
| 2008/0043224 A1 | 2/2008 | Castonguay et al. | 356/73 |
| 2008/0285048 A1 | 11/2008 | Chen et al. | 356/492 |
| 2008/0304077 A1* | 12/2008 | Demarest | 356/486 |
| 2010/0171960 A1* | 7/2010 | Huang | 356/477 |

OTHER PUBLICATIONS

International Search Report issued in corresponding application No. PCT/US03/38005, dated Apr. 14, 2004 (5 pgs).
International Search Report issued in corresponding application No. PCT/US03/38004, dated Apr. 12, 2004 (1 pg).
International Search Report issued in corresponding application No. PCT/US04/05815, dated Jun. 14, 2006 (3 pgs).
J.C. Stover, "Optical Scattering: Measurement and Analysis," McGraw-Hill, NY (1990) (book, copy not available).
Koliopoulos, Chris L., "Simultaneous phase shift interferometer", Advanced Optical Manufacturing and Testing II, Jan. 1992, pp. 119-127, vol. 1531, Tucson, Arizona.
Nakadate et al., "Real-Time Fringe Patter Processing and its Applications", Proc. of SPIE, vol. 2544, pp. 74-86, Jun. 1995 (Abstract only).
Office Action issued in related U.S. Appl. No. 12/828,031, dated Feb. 12, 2013 (7 pgs).
Office Action issued in related U.S. Appl. No. 12/828,031, dated Jul. 18, 2012 (7 pgs).
Office Action issued in related U.S. Appl. No. 13/215,071, dated Aug. 7, 2012 (16 pgs).
Office Action issued in related U.S. Appl. No. 13/215,071, dated Jun. 17, 2013 (14 pgs).
Office Action issued in related U.S. Appl. No. 13/215,071, dated Feb. 24, 2012 (14 pgs).
Office Action issued in related U.S. Appl. No. 13/474,225, dated Jul. 13, 2012 (6 pgs).
Schwider, "Single-frame realtime interferometer (SIFRI)", Aug. 21, 1998, pp. 1-3, http://www.optik.uni-erlangen.de/mikos/projects/sifri/sifri.htm.
Sivakumar et al., "Large surface profile measurement with instantaneous phase-shifting interferometry", Optical Engineering, Jul. 14, 2002, pp. 367-372, vol. 442.

* cited by examiner

METHODS FOR DETERMINING ERROR IN AN INTERFEROMETRY SYSTEM

CROSS REFERENCE TO RELATED APPLICATIONS

This application claims priority from U.S. Provisional Application Ser. No. 61/629,629, filed Nov. 22, 2011, the contents of which are incorporated herein by reference.

FIELD OF THE DISCLOSURE

This present disclosure is generally related to an interferometric system and method of measurement, and more particularly is related to an interferometric system and related method for enabling measurements of a wavefront in the presence of vibration or other disturbances that impede accurate measurements and allow separation of internal instrument errors from the measurement results.

BACKGROUND OF THE DISCLOSURE

Simultaneous phase-shifting interferometers solve many problems associated with full-field interferometric measurements such as surface profiles of optical components. They are capable of acquiring all required information at the same instant—and diminishing influence of environmental vibrations, air thermals, and moving test surfaces.

In particular, some of these instruments utilize polarization as a means for obtaining required phase shifted images. Typically this involves illuminating the object with a linearly polarized light beam while the reference surface such as reference flat or sphere is illuminated with orthogonally polarized light. After recombining these beams, additional polarization components allow simultaneous observation of phase-shifted fringe patterns used to recover the test object's shape. Examples of these interferometers are shown in our earlier U.S. Pat. No. 8,004,687.

However, these types of interferometers are non-common path either geometrically and/or polarization wise. This means the test and reference wavefronts are affected in different ways as they travel through the optics of the interferometer system. These effects can result in measurement errors.

The information contained in these two beams is carried as a difference in phase of the optical waves which is influenced by polarization dependent properties of optical components in the interferometer. Test and reference beams can be subject to different influences as they propagate through the system and they contribute to the measurement error. Examples of such influences are birefringent materials, coating properties, optical stress, angle of incidence of the polarized light with respect to the object surface or object ti surface properties.

Typically, these errors are removed by measurement and subtraction of a known calibrated reference optic. Unfortunately, they can be pricey and their error characteristic must be superior to that of the actual test object. Removing these errors typically requires the use of expensive precision optics and additional test procedures.

Thus, a heretofore unaddressed need exists in the industry to address the aforementioned deficiencies and inadequacies.

SUMMARY OF THE DISCLOSURE

Non-Common path errors can be separated into output and input wavefront categories. In the prior art Fizeau interferometer shown in FIG. 1, output wavefronts W and V travel out of interferometer 10 through module 14 at separate angles which will result in some measurement error. In addition wavefronts W and V are orthogonally polarized, thus they will be affected by optical birefringence in different and unpredictable ways dependant on stress and temperatures in the system. The return reflected wavefronts Wr and Vt or Vr and Wt are parallel when aligned for measurement, however they will be sheared with respect to each other and with respect to the reference optic due to test wavefronts Wt or Vt traveling longer distances. This shear can cause errors with a non-flat reference optic R. In addition, since Wr and Vt or Vr and Wt are orthogonally polarized they will induce additional polarization errors as they travel through modules 14, 16, and 18.

Figures 1, 2A, 2B:
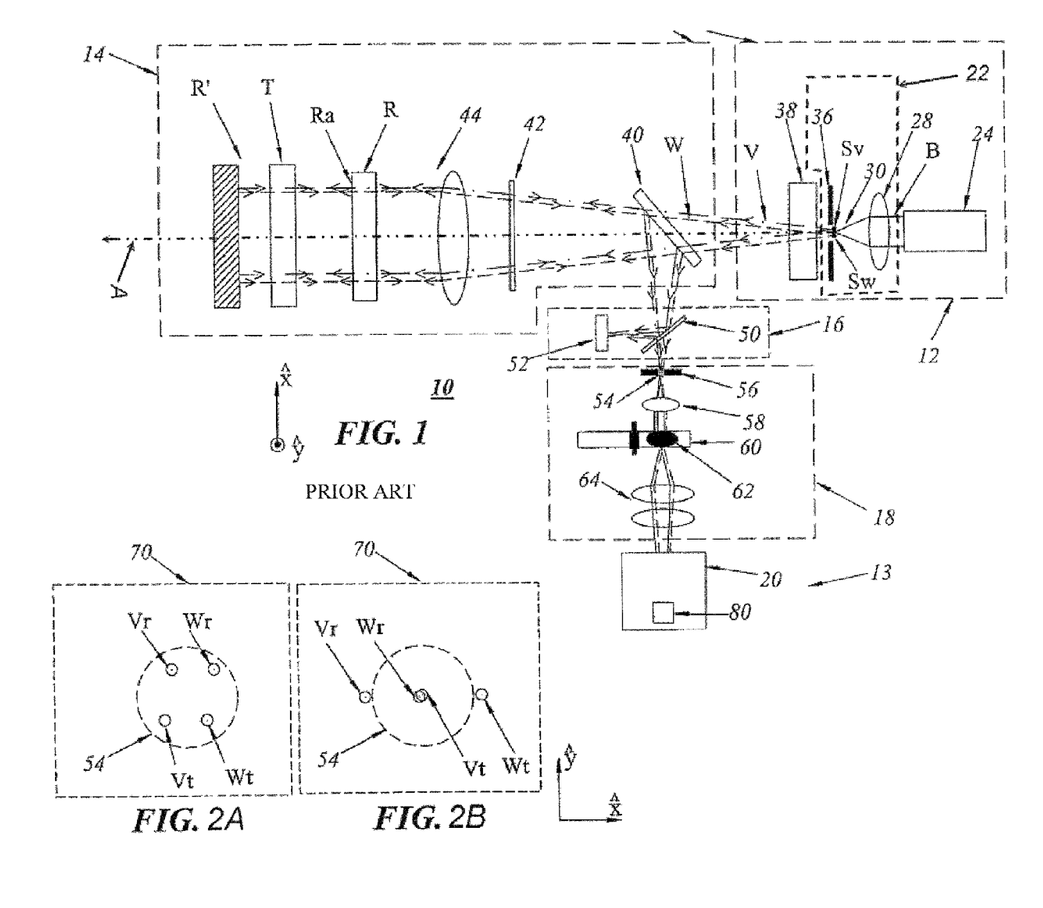
FIG. 1 is a plan view of an interferometry system, as known in the prior art.
FIGS. 2A and 2B are plan views of an image displayed on an alignment camera of the interferometry system of FIG. 1, showing, respectively, wavefronts without overlap before alignment, and wavefronts with overlap after alignment.

While modules 14, 16, and 18 can provide other means of creating and processing of wavefronts W and V, other known methods will experience one or more of the aforementioned errors. These errors are described herein as the signature or system error of the interferometer. The present disclosure provides methods for determining and/or eliminating the signature error, which may be composed of geometric and polarization error sources only.

SUMMARY OF THE INVENTION

Embodiments of the present disclosure provide methods for determining system errors in an interferometry system. Briefly described, in architecture, one embodiment of the methods, among others, can be implemented as follows. The interferometry system may have two light sources orthogonally polarized with respect to each other wherein each light source reflects from a reference surface and a test surface, creating four reflected beams (Wr, Vr, Wt, Vt). A first interference measurement (M1) is performed from Wr-Vt. A second interference measurement (M2) is performed from Wt-Vr. A third measurement (M3), indicative of the interferometric system error, is calculated by averaging the first and second measurements ([M1+M2]/2). The method may further include the step of producing an error-adjusted interferometry test result by subtracting the third measurement (M3) from the first measurement (M1).

In another embodiment, a method is disclosed for performing an error-adjusted interferometry measurement in an interferometry system having two light sources orthogonally polarized with respect to each other wherein each light source reflects from a reference surface and a test surface, creating four reflected beams (Wr, Vr, Wt, Vt), the method including the steps of: performing a first interference measurement (M1) from Wr-Vt; performing a second interference measurement (M2) from Wt-Vr; and calculating an error-adjusted interferometry test result (M4) by averaging the first measurement with the additive inverse of the second measurement ([M1−M2]/2).

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

FIG. 1 shows a known polarization based interferometer as described in our earlier U.S. Pat. No. 8,004,687, the entirety of which is incorporated herein by reference. An interferometric system 10 is shown in FIG. 1. The illustrated embodiment of the system 10 has, in optics parlance, a front end or front end assembly 11 and a back end or back end assembly 13. The front end 11 includes at least a source or source module 12 and an interferometry module 14. The back end 13 includes at least a simultaneous (or substantially simultaneous) phase-shifting module 20 for generating multiple phase-shifted interferograms suitable for a wide variety of applications in many different fields. Some examples include, without limitation, generating 3-D surface profiles, computing aberrations for tested optical systems, distribution of velocity of a gas flow chamber and distribution of refractive index within optical materials. The embodiment of the back end 13 shown in FIG. 1 also includes an alignment module 16 and an imaging system 18. The source 12 is configured to generate mutually orthogonally polarized beams that enter the interferometry module 14 for purposes of interacting with a test optic or object (and a reference optic or object) whose characteristics are to be acquired. That is, the characteristics of the test and reference object are imparted, respectively, to test beams and reference beams emerging from the interferometry module 14. Advantageously, the interferometry module 14 is configured as a Fizeau or a Fizeau-type characterized by a substantially common optical path for both reference and test beams, between at least the non-polarizing beamsplitter 40 and reference surface Ra.

In the interferometric system of FIG. 1, the reference and test beams emerging from the interferometry module 14 encounter the alignment module 16 and the imaging system 18 before entering the phase shifting module 20. Measurement results are compiled from two or more (and preferably may be three to six) interferograms obtained simultaneously by the module 20.

The source 12 as shown in FIG. 1 has a polarized source 24 generating a beam of linearly polarized light (or wavefront) B that passes through a lens 28 which focuses the light through an aperture or pinhole 30 configured in a spatial filter 36. The wavefront B then travels through polarization beamsplitter element 38 which generates (or otherwise splits the wavefront B into) two mutually orthogonally polarized wavefronts V and W. The optical element 38 which operates as a polarization beamsplitter on the light beam B to produce the mutually orthogonally polarized wavefronts V and W can assume a number of different configurations and/or embodiments.

The two mutually orthogonally polarized wavefronts V and W exiting the polarization beamsplitter element 38 are displaced with respect to each other as if they originated from two slightly spatially separated (virtual or real) sources Sv and Sw, respectively. With respect to the embodiment of FIG. 1 and for ease of discussion, the sources Sv and Sw are horizontally displaced from each other. That is, using the Cartesian coordinate system X-Y shown in FIG. 1, where the X axis is in the plane of the drawing and the Y axis is perpendicular out of the plane, the sources Sv and Sw have the same Y coordinate, but have different X coordinates.

Entering the interferometry module 14, the two wavefronts V and W (mutually orthogonally polarized and emanating from spatially separated sources Sv and Sw, respectively) travel through various optics, including a non-polarizing beamsplitter 40, a optional quarter or half wave waveplate 42, a collimator 44 (whose focal plane defines the location of the virtual sources Sv and Sw), before they encounter a reference or known object R. There, a percentage of each of the two wavefronts V and W reflects off a surface Ra of the reference object R, while another percentage of the wavefronts V and W travels (to the left) toward a test object T. The percentage reflected off the surface Ra forms reference wavefronts Vr and Wr which (traveling to the right in FIG. 1) transmit back through the collimator 44 and the quarter waveplate 42 and reflect off the non-polarizing beamsplitter 40 to exit the interferometry module 14. As such, the reference wavefronts Vr and Wr now carry characteristics or information about the reference surface Ra which were imparted to these wavefronts as they reflected off or otherwise interacted with the reference surface.

The other percentage of the two wavefronts V and W that transmitted completely through the reference object R continues to travel toward the test object T (to the left in FIG. 1). A reflection off the test object T forms test wavefronts Vt and Wt (traveling to the right in FIG. 1) which then return through the reference object R, the collimator 44 and the quarter waveplate 42 before reflecting off the non-polarizing beamsplitter 40 to exit the interferometry module 14. The test wavefronts Vt and Wt now carry characteristics or information about the test object T which were imparted to these wavefronts as they reflected off or otherwise interacted with the test object T. It is understood by one of ordinary skill in the art that depending on the optical properties of the test object T, wavefronts incidental on the test object T can also can transmit through the test object T and reflect off a second reference object R' (to create Vt' and Wt', not shown). In the latter event, the wavefronts Vt' and Wt' are treated by the system 10 in a fashion similar to that described herein for the wavefronts Vt and Wt.

A portion of the four wavefronts Vr, Wr, Vt and Wt exiting the interferometry module 14 are diverted to the alignment module 16, by reflection off a mirror 50 toward an alignment camera 52. The mirror 50 is positioned or flipped out of the beam path when the system 10 is operating in the measurement mode, and positioned or flipped back in the beam path during the alignment mode. When used, the alignment camera 52 is positioned at the focal point of the portion of the wavefronts Vr, Wr, Vt and Wt reflected off the mirror 50 so that each of these reflected portions of the wavefronts forms a localized image or spot on an image sensor of the camera 52.

As shown in FIG. 2A, an image 70 of the camera 52 displays a plurality of four localized images or spots, each of which corresponds to one of the wavefronts Vr, Wr, Vt and Wt. The relative positioning and plurality of the spots, namely four, are due to the spatial separation between the sources Sv and Sw, the angular tilt position of the reference object R and the test object T (or the reference object R', as the case may be). In particular, the x displacement between the dots of the wavefronts Vr and Wr (or Vt and Wt) corresponds with the x displacement between the virtual sources Sv and Sw (see FIG. 1) and the displacement along the y axis between the dots of the wavefronts Vr and Vt (or Wr and Wt) corresponds to the relative tilt orientation of (or angle between) the reference object R and the test object T (or the reference object R', as the case may be).

In order to generate an interferogram purposeful for revealing information about the test object T, a test wavefront is to at least overlap a reference wavefront. Consequently, orthogonally polarized wavefronts are to overlap sufficiently at the input of the simultaneous phase-shifting module 20, in order for simultaneous phase-shifted interferograms to be generated. Accordingly, of the four polarized wavefront spots, either the orthogonal pair Vr and Wt are to overlap, or the orthogonal pair Wr and Vt are to overlap. To that end, the alignment camera 52 provides the user with a view of the relative positioning of the four wavefronts and any visible degree of overlap between them.

In the situation shown in FIG. 2A, the four spots of the wavefronts Vr, Wr, Vt and Wt of image 70 are without any visible degree of overlap. In that regard, the reference object R and the test object T are mounted on tip-tilt mechanisms, as understood by one of ordinary skill in the art, to enable the user to adjust the relative positioning or orientation angle of the objects R and T so as to manipulate the four spots into an overlapping position or relationship on the image 70. By tipping and/or tilting either the reference object R or the test object T, the user can move and reposition the spots so that the pair of the wavefronts Wr and Vt are superimposed, or that the pair of the wavefronts Wt and Vr are superimposed.

As shown in the FIG. 2B, the user has adjusted the tip-tilt mechanisms of the interferometry module 14 such that the image 70 indicates an overlap between the spots of the wavefronts Wr and Vt. The remaining two spots Vr and Wt in FIG. 2B are separated, and their spacing is such that they will not pass through the aperture hole 54 in the spatial filter 56. The spatial separation of Sv and Sw and the size of the aperture hole 54 are selected such that when two orthogonal spot pairs (either Wr and Vt, or Wt and Vr) are overlapped, the remaining two spots are blocked by the spatial filter 56. If these blocked wavefronts were allowed to pass the spatial filter 56, they would contribute undesirable coherent background light in the module 20, resulting in noise in the final measurement result. (The size of the aperture hole 54, and the spatial separation of Sv and Sw can be constructed to be adjustable, so they can be varied for special applications.)

The wavefronts Wr and Vt are now appropriately positioned relative to each other as shown in FIG. 2B. Portions of the four wavefronts Vr, Wr, Vt and Wt have bypassed the mirror 50, and proceeded to enter the imaging system 18. Wavefronts Vr and Wt are blocked by the spatial filter 56 (see FIG. 2B). The two overlapped wavefronts Wr and Vt pass through the aperture hole 54 of the spatial filter 56, and transmit through collimator 58, before encountering a diffuser 60. Alternatively, the user could have selected the alternative the pair of the spots Vr and Wt by operating the tip-tilt mechanisms accordingly.

Because the diffuser 60 maintains the polarization, the overlapped orthogonal wavefronts Wr and Vt, which form a disc of light 62 on the diffuser, will remain orthogonally polarized as they propagate beyond the diffuser 60. It is understood by one of ordinary skill in the art that the diffuser 60 is optional and that it is used to reduce speckle in the resulting interferograms. In any case, the wavefronts Wr and Vt forming the disc of light 62 on the diffuser 60 are then imaged or otherwise relayed by lenses 64 (e.g., zoom lenses) to the simultaneous phase-shifting apparatus 20, with their mutually orthogonal polarizations maintained in the state they were in on the surface of the diffuser 60. The wavefronts Wr and Vt can now be manipulated and processed by the module 20 to interfere and produce interferograms, of which two or more (and may preferably be three to six) phase-shifted interferograms may be produced substantially simultaneously and used for final analysis.

Thus, polarization based simultaneous phase-shifting interferometers may acquire interferograms by using linearly orthogonally polarized beams in the test and reference arms of the instrument. In accordance with the present disclosure, an interferometer may acquire two sets of interferograms ("M1" and "M2"), acquired with two different orthogonal polarization orientations of the test beam, while maintaining the test wavefront's on-axis relationship. In each case the reference beam is also changed to ensure its polarization is orthogonal to the test beam. The 3D profiles resulting from these two measurements can then be combined to remove influence of several classes of errors caused by non-common path propagation of the optical beams.

In a first mode, the first measurement (M1) is averaged with the second measurement (M2), which results in a value (M3) which contains the error signature of the interferometer system. In the interferometry system of FIG. 1, this error signature includes non-common path errors in modules 18, 16, and 14 up to the surface Ra. In a second mode, M2 is inverted and averaged with M1, which results in a value M4 which contains a 3D phase profile of test object T with respect to object Ra.

The second mode may be particularly useful because reversal of the test and reference polarizations reverses the sign of the 3D phase profile of object T with respect to surface Ra while the sign of the polarization error signature is constant. This causes polarization related errors to be removed from the final results. Additionally, the geometric errors cancel out because the reference wavefront r moves from one side of the optical axis A to the opposite side by the same amount. As a result, inverting M2 and averaging with M1 cancels out all error signatures. Likewise, averaging M1 with M2 cancels out the 3D phase profile of object T with respect to Ra, leaving the interferometer error signature. As mentioned, the error signature is limited to geometric and polarization errors.

Figure 3A:
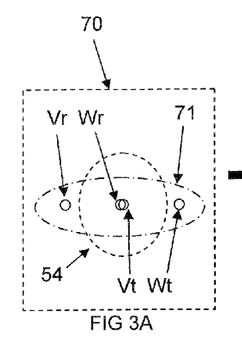
FIGS. 3A, 3B and 3C are plan views of images displayed on an alignment camera of the interferometer of FIG. 1, showing, respectively, wavefronts with overlap alignment for a first measurement (FIG. 3A), wavefront with overlap at an interim alignment stage (FIG. 3B) and wavefronts with overlap for a second measurement (FIG. 3C).

In describing the systems provided by the present disclosure, reference is again made to the interferometer shown in FIG. 1. In order to perform measurements M1 and M2, the polarization and angular direction of propagation of wavefronts V and W are adjusted. To start, the test object T is tilted (may be manually tilted by a user, or automatically tilted by a motorized or other tilt device) to a position where wavefront Vt propagates along the interferometer's optical axis A and is centered on the retical 70, as shown in FIG. 3A. The reference optic R is also adjusted (manually or automatically) to position the wavefront Wr to be at the retical's 70 center, as shown in FIG. 3A. At this point, wavefront Vt is parallel to interferometer optical axis A and Wr is off-axis (see axis A in FIG. 1). The user now acquires the measurement M1 (as shown in FIG. 3A). As discussed above, the other set of wavefronts (e.g., Vr and Wt in the example shown in FIG. 3A) are not visible in measurement M1, as these wavefronts are blocked by retical 70.

Figure 3B:
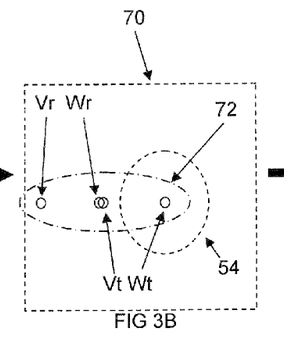

In order to acquire measurement M2 the position of the interferometer's orthogonally polarized sources and reference optic are adjusted. As shown in FIG. 1, there are two spatially separated point sources, Sw and Sv, which are orthogonally polarized as shown in module 12. The position of the point sources Sw and Sv can be adjusted by moving module 22. Before taking measurement M2, the sources are moved along the line joining the two sources such that the source that was off-axis during the measurement M1 is now positioned on the optical axis and the source that was on the axis during measurement M1 is moved to an off-axis position. During the measurement M2, the new position of the second source is symmetric to the first source position in measurement M1. This results in wavefronts Wt, Vt, Wr and Vr being geometrically repositioned from configuration 71 shown in FIG. 3A to the interim configuration 72 shown in FIG. 3B. During M1 and M2 measurements either test optic wavefront (Vt or Wt) will be on the interferometer optical axis A in FIG. 1 and centered in the retical 70 as shown in FIGS. 3A and 3B respectively. Thus, the test wavefront (t) positioning is complete after the adjustment of module 22, as shown in the interim alignment stage of FIG. 3B.

Figure 3C:
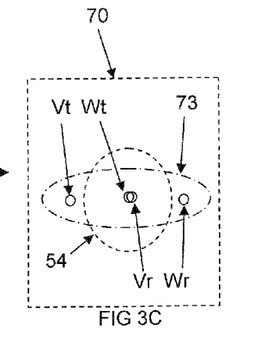

The reference wavefront Wr, which was off axis, is adjusted by twice its current off-axis angle in the opposite direction. This is done by tilting reference optic R. The reference wavefronts Wr and Vr are thus geometrically rearranged from the interim configuration 72 shown in FIG. 3B to the configuration 73 shown in FIG. 3C, from which the second measurement (M2) is acquired. The tilting of surface R may be performed in a variety of conventional motorized or manual ways.

Figure 4A:
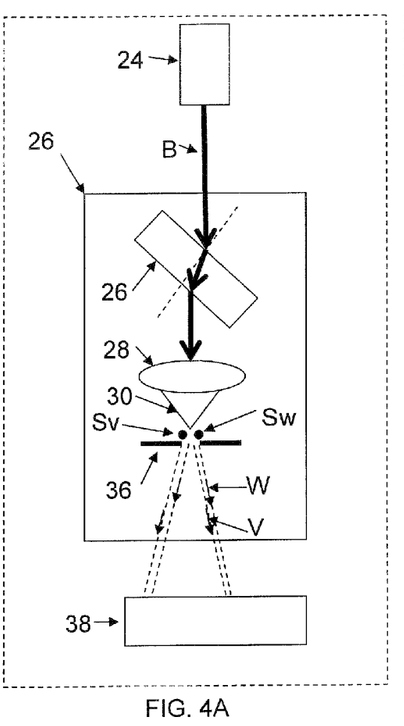
FIGS. 4A and 4B are plan views of a source module illustrating a method of repositioning test and reference beams for use in the second measurement.
Figure 4B:
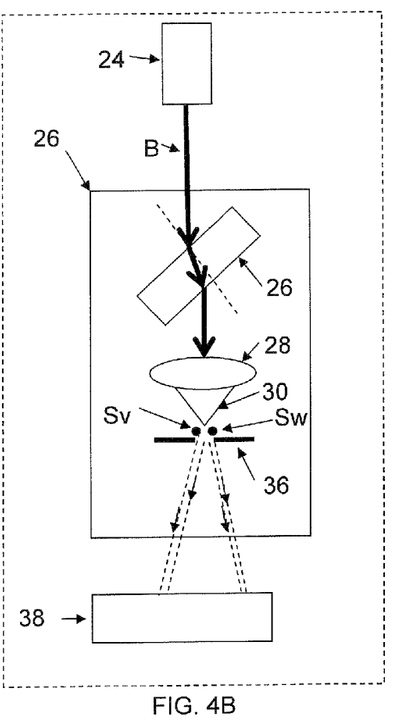

FIGS. 4A and 4B illustrate an exemplary method for adjusting the position of the point sources (e.g., Sw and Sv of the interferometer in FIG. 1), which may be utilized, for example, to acquire measurement M2. Laser source 24 is projected into glass plate 26, which diffracts the beam B at an angle, resulting in a spatial displacement of the beam B as it exits the plate 26. The beam B then follows the path as before. By rotating the module (e.g., rotating by 180 degrees), manually or using a motor, the point sources Sv and Sw are moved linearly by an amount controlled by the thickness of the plate 26.

Adjustment or swapping of point sources Sw and Sv will depend on the method that the interferometer's source module uses to create two orthogonally polarized source beams. A variety of source modules have been disclosed in our earlier U.S. Pat. No. 8,004,687.

A summary of the measurement calculations are as follows:

Errors
Eb=birefringence (polarization) error (e.g., from stress, coatings, material, etc.)
Ea=off axis errors
Et=Ea+Eb (total error)
Measurements
M1=(Vt on axis, Wr off axis plus direction); sign of phase (+); sign of error (+)
M2=(Wt on axis, Vr off axis minus direction); sign of phase (−); sign of error (+)
where,
t=test beam
r=reference beam
Polarization (W) is orthogonal to Polarization (V)
Et "sign" is the same for M1 and M2
Option 1 (First Mode):
Instrument Signature Error: (M1+M2)/2=Et=Ea+Eb
Test Optic Measurement Result=M1−Et
Option 2 (Second Mode):
Test Optic Measurement Result=[M1−M2]/2

Figure 5:
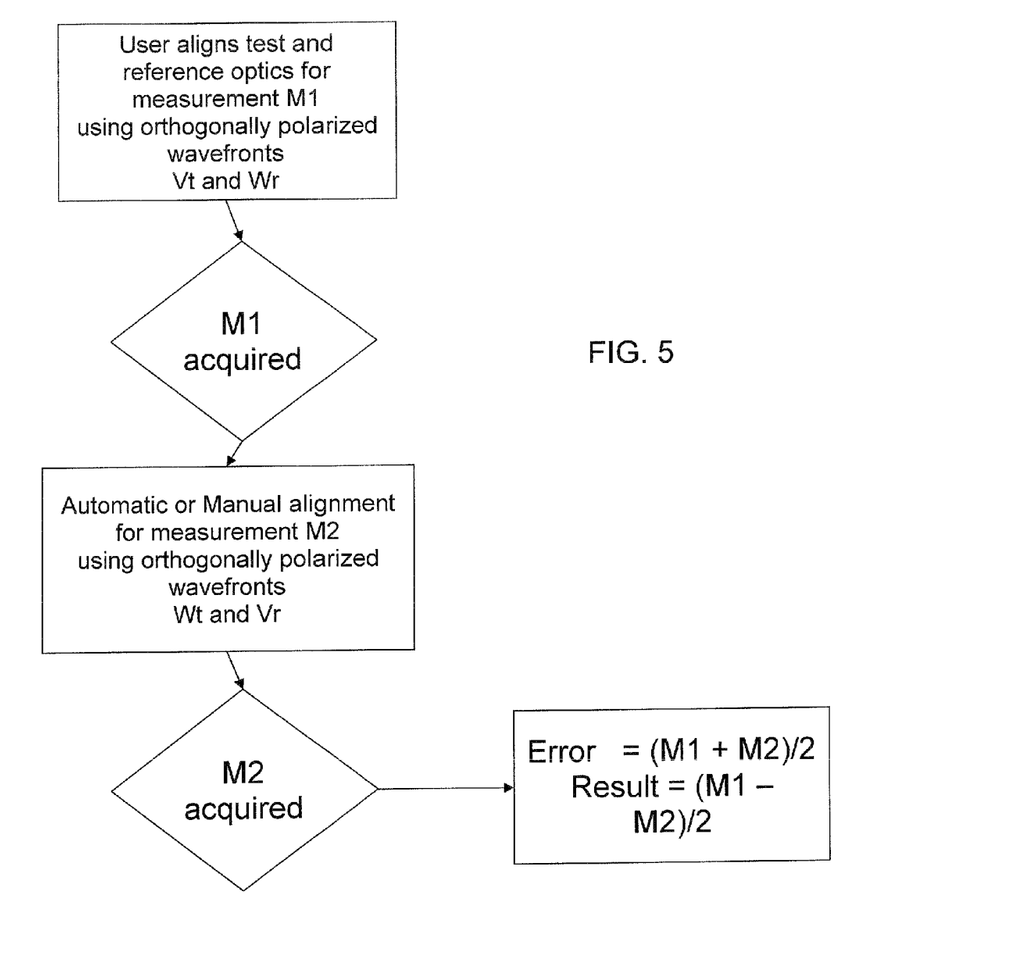
FIG. 5 is a flowchart illustrating a method for acquiring M1 and M2, and calculating the interferometry system error and the optic test measurement without the system error.

FIG. 5 is a flowchart illustrating a process for acquiring M1 and M2, and calculating or determining the interferometry system error (e.g., the signature error having polarization and/or geometric error components) as well as the optic measurement without the system error. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently in reverse order, depending on the functionality involved, as would be understood by those reasonably skilled in the art of the present invention.

As shown in FIG. 5, the test and reference optics are aligned for measuring M1 using orthogonally polarized wavefronts Vt and Wr. M1 is acquired. Automatic or manual alignment is then performed for M2, using orthogonally polarized wavefronts Wt and Vr, and M2 is acquired. The signature error ([M1+M2]/2) and the test optic measurement result ([M1-M2]/2) may thus be calculated using M1 and M2.

It should understood that the scope of the disclosure is not limited to the embodiments described above for adjusting or swapping two orthogonally polarized source beams for the purpose of error cancelation. Many other modifications and variations are possible, and it is therefore, to be understood that within the scope of the appended claims the invention may be practiced otherwise than as specifically described.

It is also understood that swapping of Wr and Vt with Wt and Vr can also be performed manually or by motorization by simply adjusting the tip and tilts of both the reference R and test optic T, for example, in the interferometry system shown in FIG. 1. This achieves the desired cancelation of polarization errors, but not geometric errors due to the test wavefront being off-axis in one of the measurements.

In all proposed and obvious methods the desired beams can be manually controlled by a human user, or performed automatically through electronic and/or software means.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for determining interferometric system error in an interferometry system having an optical axis and two light sources orthogonally polarized with respect to each other wherein each light source reflects from a reference surface and a test surface, creating four reflected beams (Wr, Vr, Wt, Vt), the method comprising:

performing a first interference measurement (M1) from Wr-Vt, wherein the reflected beam Vt is parallel to the optical axis and the reflected beam Wr is off the optical axis;

performing a second interference measurement (M2) from Wt-Vr, wherein the reflected beam Wt is parallel to the optical axis and the reflected beam Vr is off the optical axis, wherein M1 and M2 each have a fixed correct component and a fixed error component, and wherein M2 has the fixed correct component as an inverse of M1; and calculating a third measurement (M3), indicative of the interferometric system error, by summing the first and second measurements according to the following equation:

$$([M1+M2]/2).$$

2. The method of claim 1, wherein the positions of the reflected beams for measuring the first (Wr-Vt) and second interference measurements (Wt-Vr) are manually adjusted.

3. The method of claim 1, wherein the positions of the reflected beams for measuring the first (Wr-Vt) and second interference measurements (Wt-Vr) are automatically controlled by an electronic device.

4. The method of claim 3, wherein said electronic device is motor controlled by a computer.

5. The method of claim 1, wherein said light sources are linear polarized.

6. The method of claim 1, wherein said light sources are circular polarized.

7. The method of claim 1, wherein said system error comprises optical birefringent errors.

8. The method of claim 1, wherein said system error comprises geometric errors.

9. The method of claim 1, wherein said system error comprises errors caused by said light sources traveling along different paths.

10. The method of claim 1, further comprising:
producing an error-adjusted interferometry test result by subtracting the third measurement (M3) from the first measurement (M1).

11. A method for performing an error-adjusted interferometry measurement in an interferometry system having an optical axis and two light sources orthogonally polarized with respect to each other wherein each light source reflects from a reference surface and a test surface, creating four reflected beams (Wr, Vr, Wt, Vt), the method comprising:

performing a first interference measurement (M1) from Wr-Vt, wherein the reflected beam Vt is parallel to the optical axis and the reflected beam Wr is off the optical axis;

performing a second interference measurement (M2) from Wt-Vr, wherein the reflected beam Wt is parallel to the optical axis and the reflected beam Vr is off the optical axis wherein M1 and M2 each have a fixed correct component and a fixed error component, and wherein M2 has the fixed correct component as an inverse of M1; and calculating an error-adjusted interferometry test result (M4) by summing the first measurement with the additive inverse of the second measurement according to the following equation:

$$([M1-M2]/2).$$

12. The method of claim 11, wherein the positions of the reflected beams for measuring the first (Wr-Vt) and second interference measurements (Wt-Vr) are manually adjusted.

13. The method of claim 11, wherein the positions of the reflected beams for measuring the first (Wr-Vt) and second interference measurements (Wt-Vr) are automatically controlled by an electronic device.

14. The method of claim 13, wherein said electronic device is motor controlled by a computer.

15. The method of claim 11, wherein said light sources are linear polarized.

16. The method of claim 11, wherein said light sources are circular polarized.

17. The method of claim 11, wherein said system error comprises optical birefringent errors.

18. The method of claim 11, wherein said system error comprises geometric errors.

19. The method of claim 11, wherein said system error comprises errors caused by said light sources traveling along different paths.

* * * * *